United States Patent
Misra et al.

(10) Patent No.: US 12,347,067 B2
(45) Date of Patent: Jul. 1, 2025

(54) SYSTEM AND METHOD FOR ENHANCING TEXT IN IMAGES BASED ON SUPER-RESOLUTION

(71) Applicant: Walmart Apollo, LLC, Bentonville, AR (US)

(72) Inventors: Saptarshi Misra, West Bengal (IN); Anirban Chatterjee, Karnataka (IN); Pranay Dugar, Corvallis, OR (US); Kunal Banerjee, Karnataka (IN); Lalitdutt Parsai, Indore (IN)

(73) Assignee: Walmart Apollo, LLC, Bentonville, AR (US)

( * ) Notice: Subject to any disclaimer, the term of this patent is extended or adjusted under 35 U.S.C. 154(b) by 339 days.

(21) Appl. No.: 18/079,225

(22) Filed: Dec. 12, 2022

(65) Prior Publication Data

US 2024/0193726 A1 Jun. 13, 2024

(51) Int. Cl.
*G06T 3/4053* (2024.01)
*G06T 3/4007* (2024.01)
(Continued)

(52) U.S. Cl.
CPC .......... *G06T 3/4053* (2013.01); *G06T 3/4007* (2013.01); *G06T 5/50* (2013.01);
(Continued)

(58) Field of Classification Search
CPC ....... G06T 3/4053; G06T 3/4007; G06T 5/50; G06T 7/73; G06T 2207/20081;
(Continued)

(56) References Cited

U.S. PATENT DOCUMENTS

2023/0019851 A1* 1/2023 Yi ........................ G06T 3/4069
2024/0013357 A1* 1/2024 Yabuuchi ............. G06V 10/454

FOREIGN PATENT DOCUMENTS

CN 112419159 A 2/2021
CN 112733716 A 4/2021
(Continued)

OTHER PUBLICATIONS

Xuebo Liu, et al., "FOTS: Fast Oriented Text Spotting with a Unified Network," (2018), pp. 5676-5685.
(Continued)

*Primary Examiner* — Nay A Maung
*Assistant Examiner* — Vaisali Rao Koppolu
(74) *Attorney, Agent, or Firm* — Morgan, Lewis & Bockius LLP; Manita Rawat

(57) ABSTRACT

Systems and methods for enhancing text in images based on super-resolution are disclosed. A low resolution image is generated based on a high resolution image. A super resolution image is generated based on the low resolution image, using a super resolution model with a set of parameters. Based on the high resolution image and the super resolution image, a total loss function is computed based on: the set of parameters, a detection loss function, a recognition loss function, and a gradient loss function of the high resolution image and the super resolution image. A trained super resolution model is generated with an optimized set of the parameters that minimizes the total loss function. Text in at least one image is enhanced using the trained super resolution model.

19 Claims, 6 Drawing Sheets

(51) Int. Cl.
*G06T 5/50* (2006.01)
*G06T 7/73* (2017.01)
*G06V 10/774* (2022.01)
*G06V 20/62* (2022.01)
*G06V 10/77* (2022.01)

(52) U.S. Cl.
CPC .............. *G06T 7/73* (2017.01); *G06V 10/774* (2022.01); *G06V 20/62* (2022.01); *G06T 2207/20081* (2013.01); *G06T 2207/20084* (2013.01); *G06V 10/7715* (2022.01)

(58) Field of Classification Search
CPC ........ G06T 2207/20084; G06T 3/4046; G06V 10/774; G06V 20/62; G06V 10/7715; G06V 30/10
See application file for complete search history.

(56) References Cited

FOREIGN PATENT DOCUMENTS

| CN | 114170608 | A | * | 3/2022 | ........... G06F 18/214 |
|---|---|---|---|---|---|
| CN | 109993702 | B | * | 9/2023 | |
| CN | 116703715 | A | * | 9/2023 | |
| KR | 101421704 | B1 | | 7/2014 | |

OTHER PUBLICATIONS

Pranay Dugar, et al., "From Pixels to Words: A Scalable Journey of Text Information from Product Images to Retail Catalog," CIKM '21, Virtual Event, Australia, Nov. 1-5, 2021, 9 pages.

* cited by examiner

SYSTEM AND METHOD FOR ENHANCING TEXT IN IMAGES BASED ON SUPER-RESOLUTION

TECHNICAL FIELD

This application relates generally to image processing and, more particularly, to systems and methods for enhancing text in images based on super-resolution.

BACKGROUND

Scene Text Recognition (STR) enables processing and understanding of the text in the wild. However, roadblocks like natural degradation, blur, and uneven lighting in the captured images result in poor accuracy during detection and recognition. An image of good quality helps in text detection and recognition in images and hence image enhancement methods are important in this context. But existing enhancement methods introduce a significant drop in the quality of the reconstructed text in the image. This drop is especially critical in the healthcare domain because any loss in accuracy can be detrimental.

Textual information contained in images can bolster the semantic understanding of real-world data. Extracting text from an image has many applications, especially in the retail industry, such as, determining brand name, ingredients, price and country of origin of a product and detecting profanity. For example, large retailers and e-commerce companies sell billions of products through their websites. All these products are associated with one or more product images containing various textual information about them. But extracting text from these images is challenging due to the image degradation, image complexities, and diversity in sizes, shapes, and orientations of texts. Recent text extraction models show a significant decline in accuracy when recognizing text in low-resolution images.

Hence, it is challenging yet desirable to generate a high-quality image with clear text from a low-quality image.

SUMMARY

The embodiments described herein are directed to systems and methods for enhancing text in images based on super-resolution image generation.

In various embodiments, a system including a non-transitory memory configured to store instructions thereon and at least one processor is disclosed. The at least one processor is configured to read the instructions to: obtain a high resolution image, generate a low resolution image based on the high resolution image, generate a super resolution image based on the low resolution image, using a super resolution model with a set of parameters. Based on the high resolution image and the super resolution image, the at least one processor is configured to read the instructions to: compute a detection loss function representing a difference between text locations detected in the high resolution image and the super resolution image, compute a recognition loss function representing a difference between texts recognized from the high resolution image and the super resolution image, compute a gradient loss function representing a difference between image gradients in the high resolution image and the super resolution image, and compute a total loss function based on: the detection loss function, the recognition loss function, the gradient loss function, and the set of parameters. The at least one processor is further configured to read the instructions to: generate a trained super resolution model with an optimized set of the parameters that minimizes the total loss function, and enhance text in at least one image using the trained super resolution model.

In various embodiments, a computer-implemented method is disclosed. The computer-implemented method includes steps of: obtaining a high resolution image; generating a low resolution image based on the high resolution image; generating a super resolution image based on the low resolution image, using a super resolution model with a set of parameters; based on the high resolution image and the super resolution image, computing a detection loss function representing a difference between text locations detected in the high resolution image and the super resolution image, computing a recognition loss function representing a difference between texts recognized from the high resolution image and the super resolution image, computing a gradient loss function representing a difference between image gradients in the high resolution image and the super resolution image, and computing a total loss function based on: the detection loss function, the recognition loss function, the gradient loss function, and the set of parameters; generating a trained super resolution model with an optimized set of the parameters that minimizes the total loss function; and enhancing text in at least one image using the trained super resolution model.

In various embodiments, a non-transitory computer readable medium having instructions stored thereon is disclosed. The instructions, when executed by at least one processor, cause a device to perform operations including: obtaining a high resolution image; generating a low resolution image based on the high resolution image; generating a super resolution image based on the low resolution image, using a super resolution model with a set of parameters; based on the high resolution image and the super resolution image, computing a detection loss function representing a difference between text locations detected in the high resolution image and the super resolution image, computing a recognition loss function representing a difference between texts recognized from the high resolution image and the super resolution image, computing a gradient loss function representing a difference between image gradients in the high resolution image and the super resolution image, and computing a total loss function based on: the detection loss function, the recognition loss function, the gradient loss function, and the set of parameters; generating a trained super resolution model with an optimized set of the parameters that minimizes the total loss function; and enhancing text in at least one image using the trained super resolution model.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
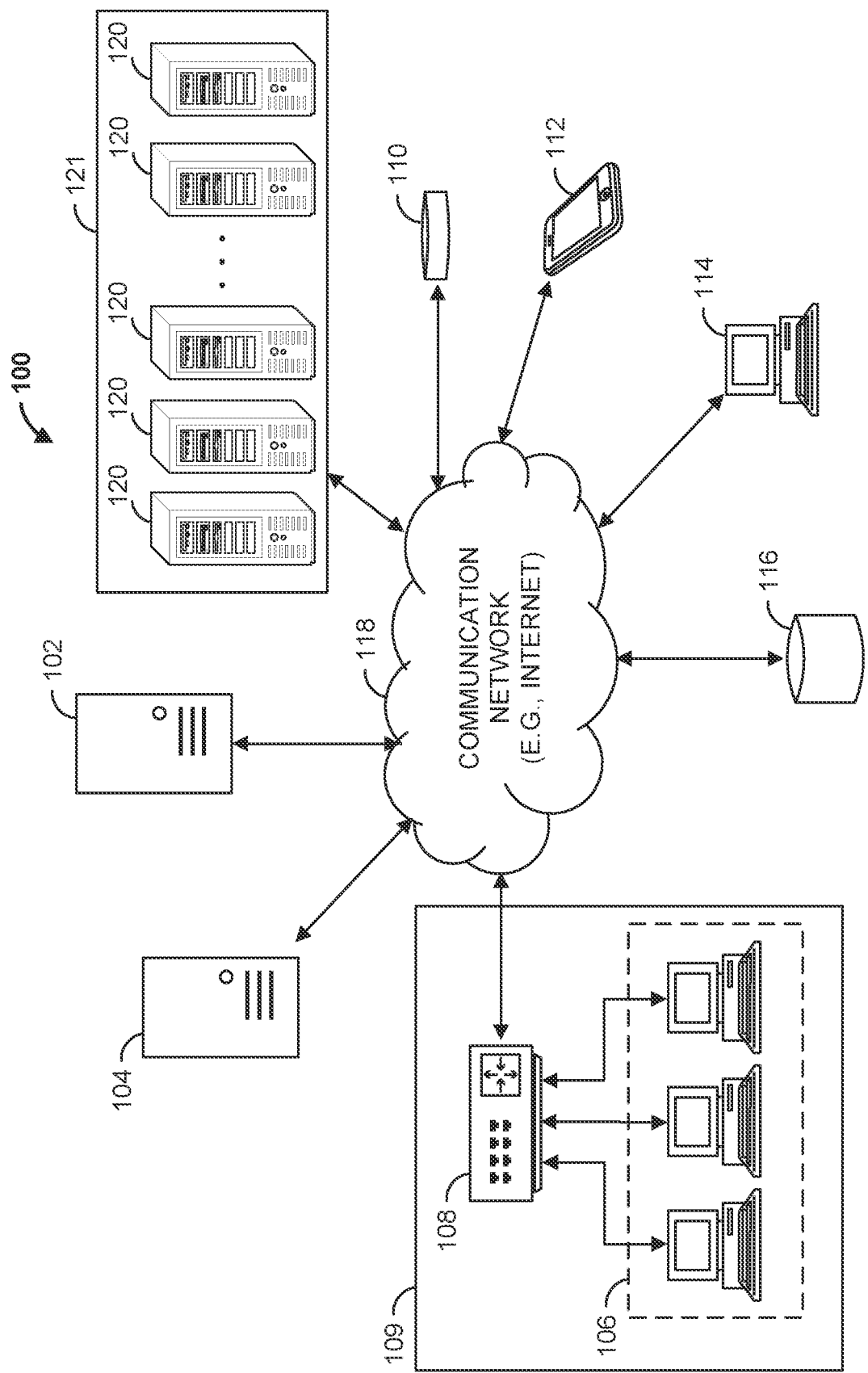
FIG. 1 is a network environment configured to enhance text in images based on super-resolution image generation, in accordance with some embodiments of the present teaching.

This description of the exemplary embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship.

In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Extracting text from an image generally follows a two-step procedure. First, the text contained in an image is localized using either a character-based or a word-based model. Second, the text in the localized region is identified using a sequence-to-sequence model. These tasks are challenging due to the image degradation, image complexities, diversity in sizes, shapes, and orientations of texts. To address these challenges, the present teaching discloses systems and methods to enhance text in images by generating a super-resolution image.

Super-Resolution (SR) is a technique used to improve the quality of an image by increasing its resolution while retaining edge consistency, to create a High-Resolution (HR) image from its Low-Resolution (LR) counterpart. SR aims to output a high-resolution image that exhibits consistency with the corresponding low-resolution image. Traditional approaches like bilinear, bicubic interpolation or designed filtering, are based on an assumption that the neighboring pixels exhibit similar colors and produce the output by interpolating colors between neighboring pixels. In the deep learning era, one approach to address this problem is to map it to a regression model. For example, given a low-resolution image, a complex non-linear function can be designed to output a corresponding high-resolution image, e.g. with an SR method based on a deep learning using a neural network architecture. Then the textual information can be extracted from the high-resolution image. In some examples, the high-resolution image including clear text may be more desirable than the extracted text alone. For example, the police or prosecutor may want to show a high-resolution image including both a car and its plate number as evidence in court, rather than showing the extracted plate number alone.

One goal of various embodiments in the present teaching is to enhance clarity or at least avoid losing clarity of text in the image, while improving the overall image quality using an SR model. In some embodiments, a system is disclosed to use a new loss function for training an SR model and use the SR model with an improved deep neural network architecture to recover text with sharp boundaries in the SR images. In some embodiments, the Peak Signal-to-Noise Ratio (PSNR) and the Structural Similarity Index Measure (SSIM) scores are not effective metrics for identifying the quality of the text in an SR image. Extensive experiments show that the disclosed SR model achieves better accuracy and visual improvements against state-of-the-art methods in terms of text recognition accuracy. In some embodiments, the disclosed SR model may be added with another solution for text extraction from product images for an online retailer.

In some embodiments, the system utilizes an approach to generate synthetic LR-HR paired data that is generalizable to real case scenarios for product images. In addition, the system can utilize a variation of perceptual loss termed recognition loss that effectively deblurs and sharpens the boundaries of the texts in the image while preserving textual characteristics. To train the SR model, the system can use an improvised multi-loss function composed of detection and recognition losses as well as image features. With a qualitative and quantitative view of how PSNR and SSIM are not good measures of image quality post super-resolution for textual details, the system shows visually and analytically superior results for text super-resolution as compared to existing approaches.

Furthermore, in the following, various embodiments are described with respect to methods and systems for enhancing text in images based on super-resolution image generation. In some embodiments, a low resolution image is generated based on a high resolution image. A super resolution image is generated based on the low resolution image, using a super resolution model with a set of parameters. Based on the high resolution image and the super resolution image, a total loss function is computed based on: the set of parameters, a detection loss function, a recognition loss function, and a gradient loss function of the high resolution image and the super resolution image. A trained super resolution model is generated with an optimized set of the parameters that minimizes the total loss function. Text in at least one image is enhanced using the trained super resolution model.

Turning to the drawings, FIG. 1 illustrates a network environment 100 configured to enhance text in images based on super-resolution image generation, in accordance with some embodiments of the present teaching. The network environment 100 includes a plurality of devices or systems configured to communicate over one or more network channels, illustrated as a network cloud 118. For example, in various embodiments, the network environment 100 can include, but not limited to, a super resolution image generation device 102 (e.g., a server, such as an application server), a web server 104, one or more training devices 120, workstation(s) 106, database 116, and one or more customer computing devices 110, 112, 114 operatively coupled over network 118. The super resolution image generation device 102, web server 104, workstation(s) 106, training device(s) 120, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the super resolution image generation device 102 and the training device(s) 120 can be a computer, a workstation, a laptop, a server such as a cloud-based server, or any other suitable device. In some examples, each of the training devices 120 is a server that includes one or more processing units, such as one or more graphical processing units (GPUs), one or more central processing units (CPUs), and/or one or more processing cores. Each training device 120 may, in some examples, execute one or more virtual machines. In some examples, processing resources (e.g., capabilities) of one or more training devices 120 are offered as a cloud-based service (e.g., cloud computing). In some examples, the one or more training devices 120 form a super resolution model training engine 121 that can train a super resolution model using the computing and storage resources of the one or more training devices 120, such that the super resolution image generation device 102 can generate super resolution images based on the trained super resolution model.

In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more retailer websites. In some examples, the super resolution image generation device 102, the training devices 120, and/or web server 104 are operated by a retailer, and the multiple customer computing devices 110, 112, 114 are operated by customers of the retailer. In some examples, the training devices 120 are operated by a third party (e.g., a cloud-computing provider).

In some embodiments, the workstation(s) 106 are operably coupled to the communication network 118 via a router (or switch) 108. The workstation(s) 106 and/or the router 108 may be located at a store 109, for example. The workstation(s) 106 can communicate with the super resolution image generation device 102 over the communication network 118. The workstation(s) 106 may send data to, and receive data from, the super resolution image generation device 102. For example, the workstation(s) 106 may transmit data identifying items purchased by a customer at store 109 to the super resolution image generation device 102.

Although FIG. 1 illustrates three customer computing devices 110, 112, 114, the network environment 100 can include any number of customer computing devices 110, 112, 114. Similarly, the network environment 100 can include any number of super resolution image generation devices 102, training devices 120, workstations 106, web servers 104, and databases 116.

In some embodiments, the communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

Each of the first customer computing device 110, second customer computing device 112, and Nth customer computing device 114 may communicate with the web server 104 over the communication network 118. For example, each of the multiple computing devices 110, 112, 114 may be operable to view, access, and interact with a website, such as a retailer's website, hosted by the web server 104. The web server 104 may transmit user session data related to a customer's activity (e.g., interactions) on the website. For example, a customer may operate one of the customer computing devices 110, 112, 114 to initiate a web browser that is directed to the website hosted by web server 104. The customer may, via the web browser, view items displayed on the website, and may click on an image icon representing an item to view detailed information about the item. The website may capture these activities as user session data, and transmit the user session data to the super resolution image generation device 102 over the communication network 118. The website may also allow the operator to add one or more of the items to an online shopping cart, and allow the customer to perform a "checkout" of the shopping cart to purchase the items. In some examples, the web server 104 transmits purchase data identifying items the customer has purchased from the website to the super resolution image generation device 102.

In some examples, a customer may be interested in some products with or without a specific feature, e.g. a food item with or without a special ingredient, by submitting a query on the website. While each product offered for purchase on the website has a product description, there may not be enough information regarding this special ingredient in the product description of every food item. In this case, a product image of a food item may include information about whether the food item contains this special ingredient or not. But the text in this product image may not always be in good quality to be easily extracted. As such, the web server 104 may transmit this product image to the super resolution image generation device 102 for text enhancement.

The super resolution image generation device 102 may execute one or more models (e.g., algorithms), such as a machine learning model, statistical model, etc., to generate a super resolution image based on a low resolution image, e.g. the product image sent by the web server 104. The super resolution image generation device 102 may transmit the super resolution image to the web server 104 over the communication network 118, and the web server 104 may determine what text is included in the product image of the food item and therefore determine whether the food item includes the special ingredient or not. Then the web server 104 may determine whether to recommend this food item to the customer or not, in response to the query submitted by the customer.

In some examples, a customer selects an item on a website hosted by the web server 104, e.g. by clicking on the item to view its product description details, by adding it to shopping cart, or by purchasing it. The web server 104 may treat the item as an anchor item or query item for the customer, and determine some recommended items that are alternative or complementary to the selected item. To better identify the recommended items, the web server 104 needs to know what features of the selected item are interesting to the customer, e.g. whether the customer has selected a specific size and color for the selected item. If so, the web server 104 will also search for items with these features for recommendation to the customer. In this case, a product image, instead of a product description, of an item may include information about whether the item has the same or similar features interesting to the customer. But the text in this product image may not be in good quality to be easily extracted. As such, the web server 104 may transmit this product image to the super resolution image generation device 102 for text enhancement.

The super resolution image generation device 102 may execute a trained super resolution model to generate a super resolution image based on the product image, to enhance the text in the product image. Based on the super resolution image, the super resolution image generation device 102 or the web server 104 may perform an optical character recognition (OCR) to extract text and determine whether the item includes features interesting to the customer. As such, the web server 104 may determine whether to recommend this item and other items to the customer. If so, the web server 104 may display the recommended items on a homepage, a catalog webpage, an item webpage, or a search results webpage of the website (e.g., as the customer browses those respective webpages).

The super resolution image generation device 102 is further operable to communicate with the database 116 over the communication network 118. For example, the super resolution image generation device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the super resolution image generation device 102, in some examples, the database 116 can be a local storage device, such as a hard drive, a non-volatile memory, or a USB stick for the super resolution image generation device 102. In some embodiments, the super resolution image generation device 102 may receive from the web server 104 user session data identifying events associated with browsing sessions, and may store the user session data in the database 116.

In some examples, the super resolution image generation device 102 may retrieve the trained super resolution model from the database 116, where the trained super resolution model is generated and stored to the database 116 by the super resolution model training engine 121. The web server 104 can store data to, and read data from, the database 116. Although shown remote to the web server 104, in some examples, the database 116 can be a local storage device, such as a hard drive, a non-volatile memory, or a USB stick for the web server 104.

In some examples, the web server 104 can train the super resolution model based on a plurality of high quality images, and a plurality of low quality images generated based on the plurality of high quality images. In some embodiments, the training process may also take into consideration the historical user session data, purchase data, and current user session data for the users of the website. After training the super resolution model, the web server 104 stores the trained model in a database, such as in database 116 (e.g., cloud storage).

The trained super resolution model, when executed by the super resolution image generation device 102, allows the super resolution image generation device 102 to generate a super resolution image based on any low resolution image. For example, the super resolution image generation device 102 may obtain the trained model from the database 116. The super resolution image generation device 102 may then receive, in real-time from the web server 104, a request to enhance text in a product image. In response to receiving the request, the super resolution image generation device 102 may execute the trained model to generate a super resolution version of the product image with enhanced text. Based on the enhanced product image, the web server 104 can determine: what category the product belongs to, what ingredients or components the product contains, what features the product has, etc.

In some examples, the super resolution model training engine 121 assigns the task of training the super resolution model (or parts thereof) for execution to one or more training devices 120. For example, training the super resolution model may include training a plurality of operation models, where each operation model may be assigned to a virtual machine hosted by a training device 120. The virtual machine may cause the models or parts thereof to execute on one or more processing units such as GPUs. In some examples, the virtual machines assign each model (or part thereof) among a plurality of processing units.

Based on the output of the model(s), the super resolution image generation device 102 may generate a super resolution image for any low resolution image. For example, the super resolution image generation device 102 may transmit a super resolution image of an item to the web server 104, and the web server 104 may determine whether to recommend the item to the customer, for display together with an anchor item selected by the customer. The super resolution image generated by the super resolution image generation device 102 can be well and equivalently applied to use cases other than e-commerce, e.g. healthcare, security check, or any application where a high quality image is desirable.

Figure 2:
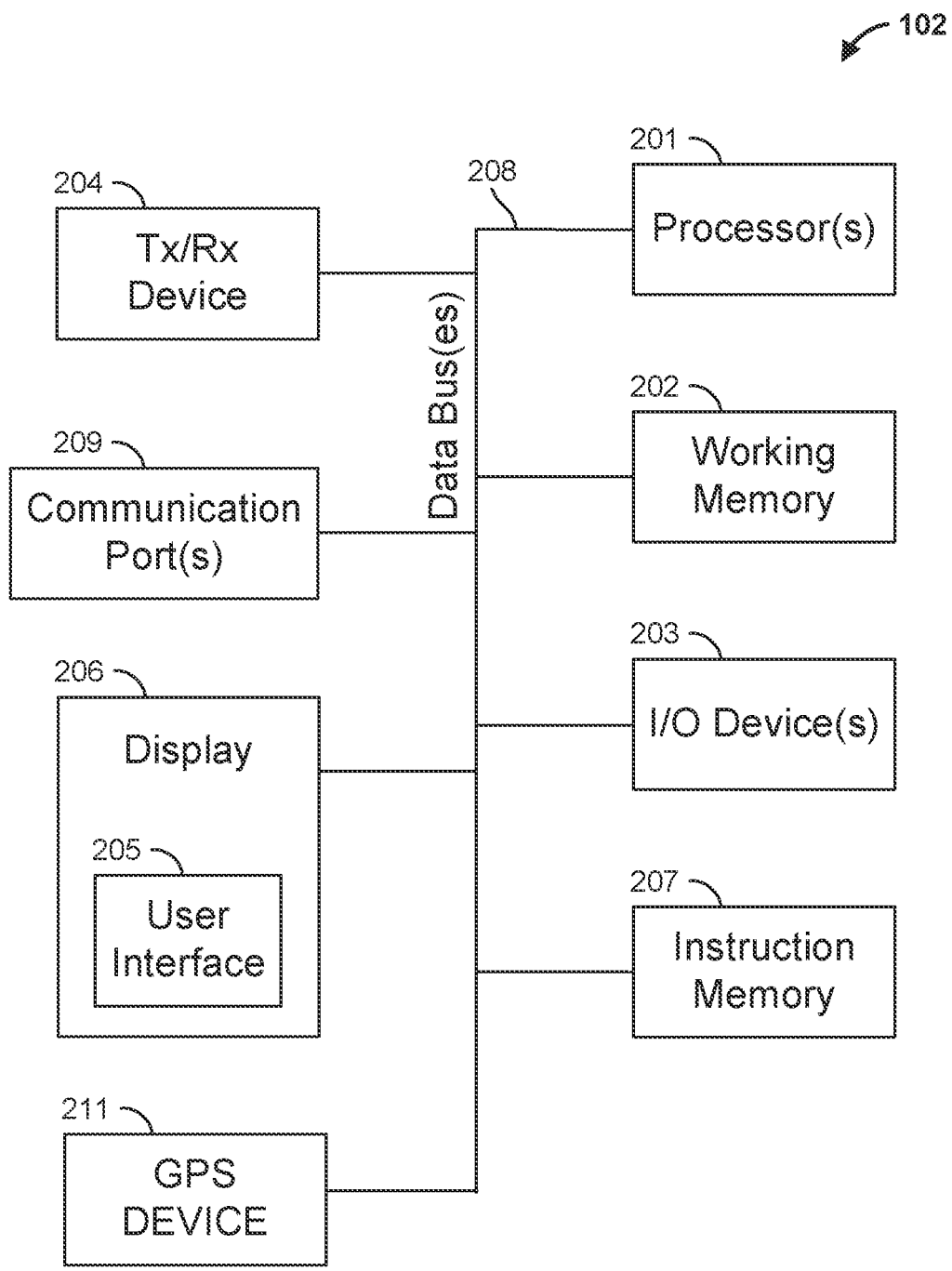
FIG. 2 illustrates a computer system configured to implement one or more processes to enhance text in images based on super-resolution image generation, in accordance with some embodiments of the present teaching.

FIG. 2 illustrates a computer system configured to implement one or more processes to enhance text in images based on super-resolution image generation, in accordance with some embodiments of the present teaching. In some embodiments, each of the super resolution image generation device 102, the web server 104, the workstation(s) 106, the multiple customer computing devices 110, 112, 114, and the one or more training devices 120 in FIG. 1 may include the features shown in FIG. 2. Although FIG. 2 is described with respect to the super resolution image generation device 102 below, it should be appreciated, however, that the elements described can be included, as applicable, in any of the super resolution image generation device 102, the web server 104, the workstation(s) 106, the multiple customer computing devices 110, 112, 114, and the one or more training devices 120.

The super resolution image generation device 102 can include one or more processors 201, working memory 202, one or more input/output devices 203, instruction memory 207, a transceiver 204, one or more communication ports 209, a display 206 with a user interface 205, and an optional global positioning system (GPS) device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 207 can store instructions that can be accessed (e.g., read) and executed by the processors 201. For example, the instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can be configured to perform a certain function or operation by executing code, stored on the instruction memory 207, embodying the function or operation. For example, the processors 201 can be configured to execute code stored in the instruction memory 207 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 207. The processors 201 can also use the working memory 202 to store dynamic data created during the operation of the super resolution image generation device 102. The working memory 202 can be a random access memory (RAM) such as a static random access memory (SRAM) or dynamic random access memory (DRAM), or any other suitable memory.

The input-output devices 203 can include any suitable device that allows for data input or output. For example, the input-output devices 203 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 207. In some examples, the communication port(s) 209 allow for the transfer (e.g., uploading or downloading) of data, such as machine learning model training data.

The display 206 can be any suitable display, and may display the user interface 205. The user interfaces 205 can enable user interaction with the super resolution image generation device 102. For example, the user interface 205 can be a user interface for an application of a retailer that allows a customer to view and interact with a retailer's website. In some examples, a user can interact with the user interface 205 by engaging the input-output devices 203. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the super resolution image generation device 102 will be operating in. The processor(s) 201 is operable to receive data from, or send data to, a network, such as the communication network 118 of FIG. 1, via the transceiver 204.

The GPS device 211 may be communicatively coupled to the GPS and operable to receive position data from the GPS. For example, the GPS device 211 may receive position data identifying a latitude, and longitude, from a satellite of the GPS. Based on the position data, the super resolution image generation device 102 may determine a local geographical area (e.g., town, city, state, etc.) of its position. Based on the geographical area, the super resolution image generation device 102 may determine relevant trend data (e.g., trend data identifying events in the geographical area).

Figure 3:
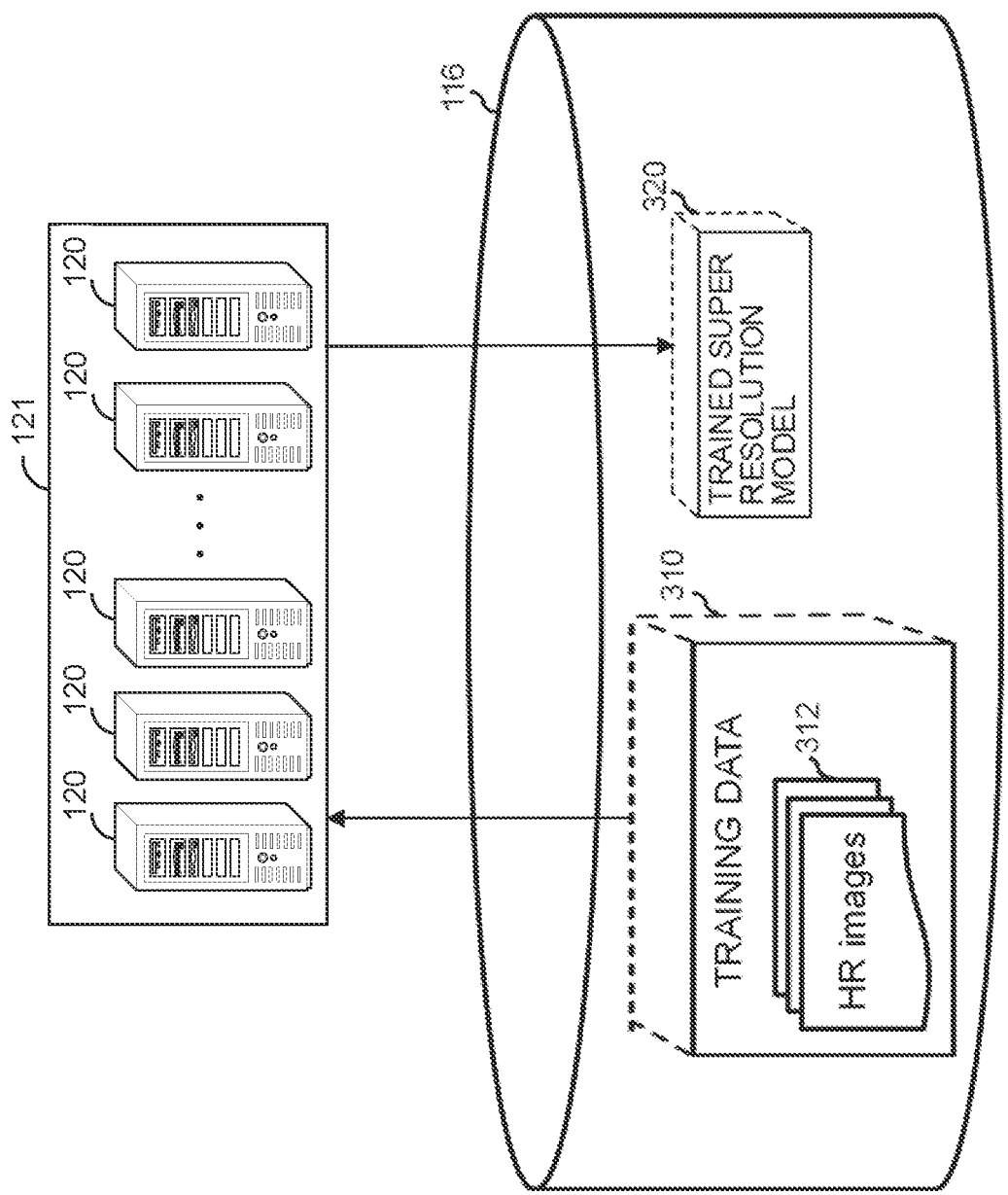
FIG. 3 is a block diagram illustrating various portions of a database for enhancing text in images, in accordance with some embodiments of the present teaching.

FIG. 3 is a block diagram illustrating various portions of a database, e.g. the database 116 of FIG. 1, for enhancing text in images, in accordance with some embodiments of the present teaching. As indicated in FIG. 3, the database 116 may include training data 310 and a trained super resolution model 320. The super resolution model training engine 121 may retrieve the training data 310 to train a super resolution model. In some embodiments, the training data 310 includes a plurality of high resolution images 312. Each of the high resolution images 312 may include some texts. The high resolution images 312 may be obtained by a camera under a good condition in a good environment, such that the texts in each of the high resolution images 312 can be easily and correctly extracted using an OCR method. As such, the high resolution images 312 may be treated as baselines or goal for the super resolution model training engine 121 to train the super resolution model.

In some embodiments, the super resolution model training engine 121 may retrieve each one of the high resolution images 312 at a time. In some embodiments, the super resolution model training engine 121 may retrieve all of the high resolution images 312 at once. In some embodiments, the super resolution model training engine 121 may retrieve the high resolution images 312 in batches.

In some embodiments, the super resolution model training engine 121 may utilize each one of the high resolution images 312 only once. In some embodiments, the super resolution model training engine 121 may utilize each one of the high resolution images 312 multiple times, in an iterative manner. In some embodiments, the super resolution model training engine 121 may utilize each of the different batches of the high resolution images 312 multiple times, in an iterative manner.

In some embodiments, the super resolution model training engine 121 may utilize only one training device 120 to train the super resolution model. In some embodiments, the super resolution model training engine 121 may utilize multiple training devices 120 to train the super resolution model based on different training data batches, respectively and in parallel.

After training, the super resolution model training engine 121 can generate a trained super resolution model 320 and store the trained super resolution model 320 in the database 116. Based on the trained super resolution model 320, text in at least one image can be enhanced. For example, upon receipt of a request to enhance text in a low resolution image, a super resolution version of the low resolution image may be generated using the trained super resolution model via at least one of: an application programming interface, a workflow application, or a software library. Then, depending on the application and use case, the generated super resolution image itself or text extracted from the generated super resolution image can be returned in response to the request.

Figure 4:
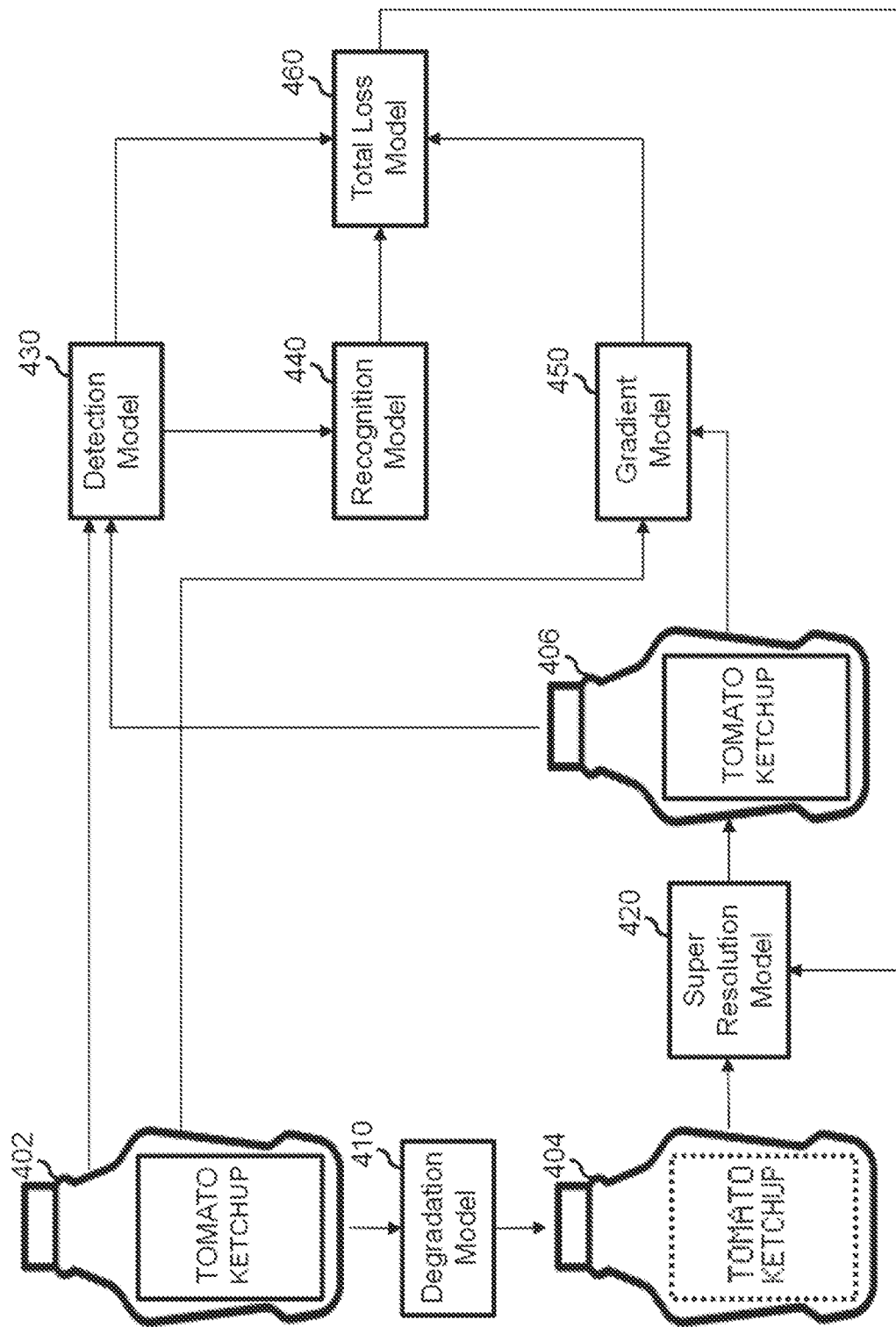
FIG. 4 is a block diagram illustrating a training process carried out by a super resolution model training engine, in accordance with some embodiments of the present teaching.

FIG. 4 is a block diagram illustrating a training process carried out by a super resolution model training engine, e.g., the super resolution model training engine 121 in FIG. 1, in accordance with some embodiments of the present teaching. As shown in FIG. 4, during a model training process, the super resolution model training engine 121 may first obtain a high resolution image 402. The high resolution image 402 may represent a product and include clear text related to the product, e.g. TOMATO KETCHUP, as shown in FIG. 4.

In some embodiments, the super resolution model training engine 121 may generate a low resolution image 404 based on the high resolution image 402, e.g. based on a degradation model 410. In some embodiments, the degradation model 410 may include both a down-sampling operation and an up-sampling operation. As such, the super resolution model training engine 121 may first down-sample the high resolution image 402 to one-fourth of a dimension of the high resolution image 402 to generate an intermediate image; and then up-sample the intermediate image to one-half of the dimension of the high resolution image 402 to generate the low resolution image 404. In some embodiments, while the down-sampling is performed based on a first interpolation method, the up-sampling is performed based on a second interpolation method. In general, the down-sampling ratio can be a different number than one-fourth, while the up-sampling ration can be a different number than one-half, so long as the operations following the degradation model 410 can degrade the high resolution image 402.

Based on the low resolution image 404, the super resolution model training engine 121 may generate a super resolution image 406 based on the low resolution image 404, using a super resolution model 420 with a set of parameters. Based on the high resolution image 402 and the super resolution image 406, the super resolution model training engine 121 may compute a plurality of loss functions based on a plurality of models.

In some examples, the super resolution model training engine 121 may compute a detection loss function based on a detection model 430. The detection loss function represents a difference between text locations detected in the high resolution image 402 and the super resolution image 406. The detection model 430 may be based on a machine learning model or another model that is predetermined or pre-trained.

In some embodiments, the detection loss function may be computed based on: computing coordinates of the high resolution image 402 to create a first image mask, and computing coordinates of the super resolution image 406 to create a second image mask. While the first image mask includes detected text regions being masked out for each pixel of the high resolution image 402; the second image mask includes detected text regions being masked out for each pixel of the super resolution image 406. Then, the super resolution model training engine 121 can compute the detection loss function based on a pixel-wise mean square error between the first image mask and the second image mask.

In some examples, the super resolution model training engine 121 may compute a recognition loss function based on a recognition model 440. The recognition loss function represents a difference between texts recognized from the high resolution image 402 and the super resolution image 406. The recognition loss function may be computed based on the detected text regions from the detection model 430. In some embodiments, the recognition loss function may be computed merely based on the detected text regions from the detection model 430. The recognition model 440 may be based on a machine learning model or another model that is predetermined or pre-trained.

In some embodiments, the recognition model 440 may find out from the affinity characters to determine: e.g. a first group of letters are closely spaced and should make one word, while a second group letters are closed spaced but far from the first group (in terms of space or different row) and should make another word.

In some embodiments, the recognition loss function may be computed based on a convolutional function to generate a first feature map from the high resolution image 402 and a second feature map from the super resolution image 406. Then the super resolution model training engine 121 may compute the recognition loss function based on a mean square error between the first feature map and the second feature map.

In some examples, the super resolution model training engine 121 may also compute a gradient loss function based on a gradient model 450. The gradient loss function represents a difference between image gradients in the high resolution image 402 and the super resolution image 406. The gradient model 450 may be based on a machine learning model or another model that is predetermined or pre-trained.

In some embodiments, the gradient loss function may be computed based on: generating a first cumulative gradient averaged across all channels in the high resolution image 402; and generating a second cumulative gradient averaged across all channels in the super resolution image 406. Then the super resolution model training engine 121 can compute the gradient loss function based on a mean absolute error between the first cumulative gradient and the second cumulative gradient.

In some examples, the super resolution model training engine 121 may compute a total loss function according to a total loss model 460. For example, the total loss function may be computed based on: the detection loss function, the recognition loss function, the gradient loss function, and the set of parameters. The total loss model 460 may be based on a machine learning model or another model that is predetermined or pre-trained.

In some embodiments, the set of parameters comprises: a first weight associated with the detection loss function, a second weight associated with the recognition loss function, and a third weight associated with the gradient loss function. As such, the total loss function may be computed based on a weight sum of the detection loss function, the recognition loss function, and the gradient loss function, with their respective associated weights.

In some embodiments, the set of parameters further comprises: a fourth weight associated with a total variation loss function computed based merely on the super resolution image 406, a fifth weight associated with a perceptual loss function computed based on the high resolution image 402 and the super resolution image 406, and a sixth weight associated with a mean square error loss function computed based on the high resolution image 402 and the super resolution image 406. As such, the total loss function can be computed based on a weight sum of the detection loss function, the recognition loss function, the gradient loss function, the total variation loss function, the perceptual loss function, and the mean square error loss function, with their respective associated weights.

In some embodiments, the super resolution model training engine 121 can iteratively perform the operations described above with respect to FIG. 4. For example, the output of the total loss model 460 may be provided as an input to the super resolution model 420 for next iteration. For example, the super resolution model training engine 121 can generate an updated super resolution model with an updated set of the parameters based on a minimization of the total loss function computed from the total loss model 460.

For example, at each iteration, each weight can be modified by a small amount or small percentage to generate one or more modified weight. As such, different combinations of unmodified and modified weights can be considered to compute different values for the total loss function. One combination can be found out to minimize the total loss function among all different combinations of unmodified and modified weights, to determine an updated set of weights for use in next iteration.

In some embodiments, without loss of generality, the high resolution image 402 shown in FIG. 4 may be treated as a first high resolution image in a series of high resolution images obtained as training data. After the process with respect to the high resolution image 402 as described above, for each additional high resolution image in the series, the super resolution model training engine 121 can: generate an additional low resolution image based on the additional high resolution image; generate an additional super resolution image based on the additional low resolution image, using the updated super resolution model with the updated set of the parameters from the preceding image in the series; and compute an additional detection loss function, an additional recognition loss function, an additional gradient loss function, and an additional total loss function, based on the additional high resolution image and the additional super resolution image. As such, based on a minimization of the additional total loss function, an updated super resolution model can be generated with an updated set of the parameters to be used for next image in the series.

In this kind of iterative operations, the additional low resolution image can be generated for each additional high resolution image in the series based on: down-sampling, based on a third interpolation method, the additional high resolution image to one-fourth of a dimension of the additional high resolution image to generate an intermediate image; and then up-sampling, based on a fourth interpolation method, the intermediate image to one-half of the dimension of the additional high resolution image to generate the additional low resolution image. In some embodiments, each of the third interpolation method and the fourth interpolation method is based on an interpolation randomly selected from the group consisting of: linear interpolation, bicubic interpolation, nearest interpolation, box interpolation, Hamming interpolation, and Lanczos interpolation. In some embodiments, the down-sampling ratio can be a different number than one-fourth, while the up-sampling ration can be a different number than one-half, so long as the generated low resolution image is a degradation compared to the corresponding high resolution image. In some embodiments, the up-sampling may be performed before the down-sampling to obtain a degraded low resolution image.

In some embodiments, the series of high resolution images can be used multiple times iteratively to train the super resolution model. In some embodiments, the series of high resolution images can be divided into different batches and iteratively utilized to train the super resolution model.

After the iterations, the super resolution model training engine 121 can generate a trained super resolution model with an optimized set of the parameters that minimizes the total loss function. While the series of high resolution images can be treated as baselines, one goal of the training is to enable the trained super resolution model to generate a super resolution image as close to the high resolution image as possible, based on any low resolution image degraded in any manner in a practical situation.

At the initial iteration, the parameters may be assigned predetermined values or random values. For example, the weights associated with the detection loss function, the recognition loss function, and the gradient loss function can be initially set to be equal to each other, e.g. all equal to one. The iterative operations may be stopped after a predetermined time period, after a predetermined number of iterations, after the total loss function is below a predetermined threshold, and/or after the total loss function cannot be further minimized by a certain amount after an additional iteration.

In some embodiments, each of the models 410~460 can be stored in a database, e.g. the database 116 shown in FIG. 1. In some embodiments, each of the models 410~460 can be updated from time to time, from iteration to iteration, and/or from batch to batch.

Figure 5:
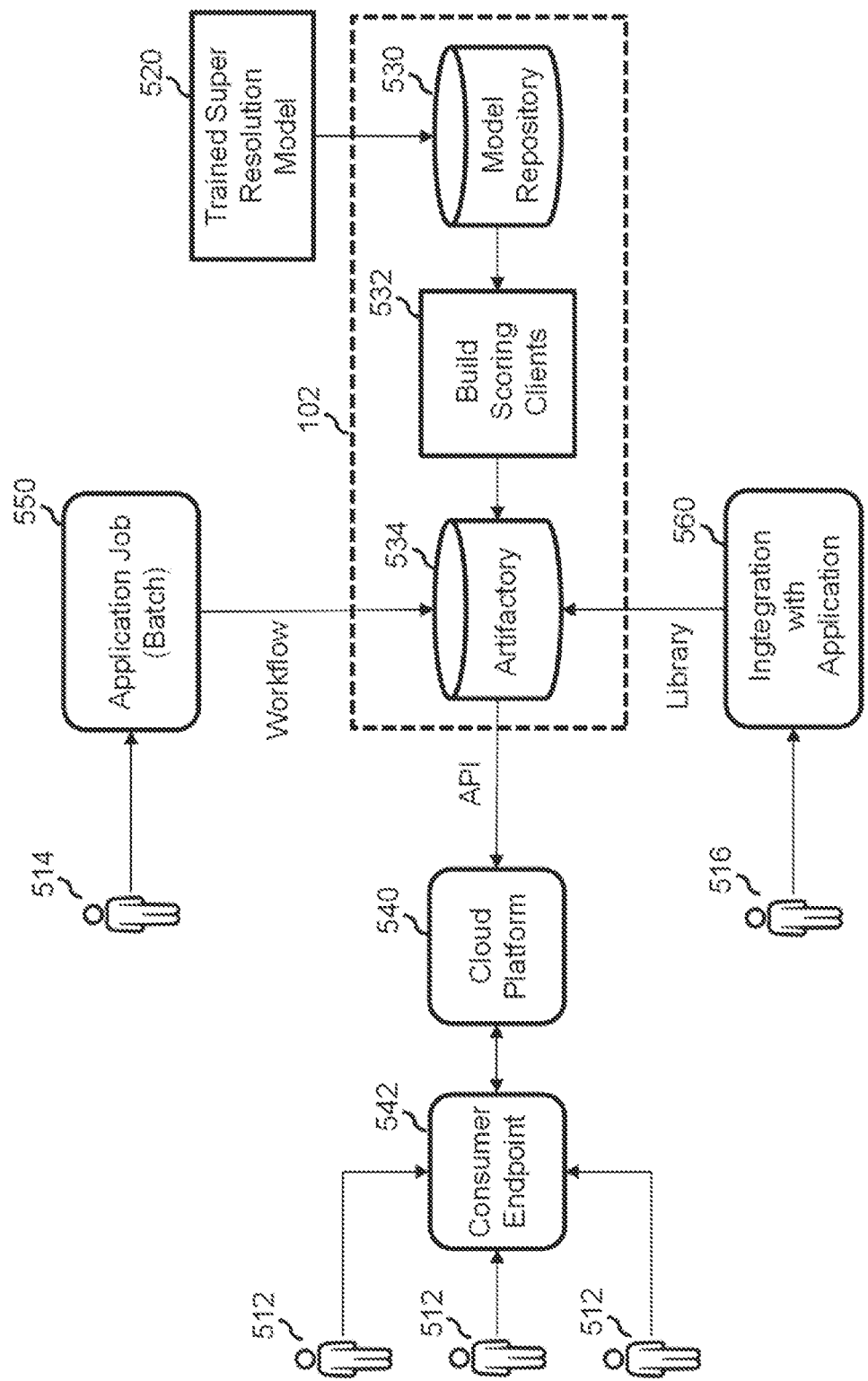
FIG. 5 illustrates various methods for enhancing text in images based on a trained super-resolution model, in accordance with some embodiments of the present teaching.

FIG. 5 illustrates various methods for enhancing text in images based on a trained super-resolution model, in accordance with some embodiments of the present teaching. In some embodiments, the methods can be carried out by a super resolution image generation device, e.g. the super resolution image generation device 102 in FIG. 1. As shown in FIG. 5, the super resolution image generation device 102 in this example includes a model repository 530, a build scoring clients module 532, and an artifactory 534.

In some embodiments, a trained super-resolution model 520 may be trained according to a process as described above with respect to FIG. 4, and then stored in the model repository 530. In some embodiments, the model repository 530 may also include other models, e.g. a model for OCR. For example, the trained super-resolution model 520 may be concatenated with the OCR model to be stored in the model repository 530 and used later as one integrated model.

In some embodiments, as far as the text recognition is concerned, various OCR methods can be adopted. For example, an OCR in a bottom-up fashion can detect individual characters first and then combine these into a word. An OCR in a top-down fashion can treat the word image region as a whole and address it as a multi-class image classification problem. As scene texts generally appear in character sequences in scene text images, an OCR method maps it to a sequence recognition problem and leverages the Recurrent Neural Network (RNN) to model the sequential features. In some examples, text recognition can be addressed with oriented or curved texts using Spatial Transformer Network (STN), which is followed by text recognition using an attentional sequence-to-sequence model.

In some embodiments, the build scoring clients module 532 may perform some packaging and building of the models stored in the model repository 530, such that an interface can be exposed to the users or customers for them to easily communicate to the models. The build scoring clients module 532 may store the packaged and built models into the artifactory 534 for client ingestion.

FIG. 5 shows how the disclosed super-resolution solution may be ingested by different clients. In some examples, different clients or actors 512 may invoke the super-resolution solution through an application programming interface (API) call. For example, a client 512 may send a low resolution image and receive its super resolution counterpart as a response. In some embodiments, the low resolution image may be sent via a consumer endpoint 542 to a cloud platform 540. The cloud platform 540 can call the super-resolution solution (based on a packaged version of the trained super-resolution model 520) from the artifactory 534 via the API, to generate the super resolution counterpart and send it back to the client 512 via the consumer endpoint 542. This mode may be preferred by clients who want to do an initial investigation or perform some benchmarking to find out whether the super resolution solution meets their business needs.

In some examples, a workflow can be set up for a dedicated client 514 who typically has a considerable number of image enhancement requests to be processed regularly. In this mode, the client 514 can send multiple images at a time (in a batch) via an Application Job module 550, and receive the outputs (super resolution counterparts) together for the images in a batch. While the super-resolution solution is the same, this mode may be faster than invocation of the super-resolution solution through the API, and can thus help meeting latency requirements of some clients. In some embodiments, the workflows may be different for different clients, e.g. different retailers. This may be because the number of images for each of these clients can be different, and different clients may have different requirements such that they may want to deploy the operations on different GPUs with different speeds.

In some examples, the super-resolution solution may also be invoked by a client 516 via a software library. In this mode, the super-resolution solution can be coded or integrated as a library that can be easily incorporated within a codebase, e.g. via the integration with application module 560. This mode is one of the simplest ways to use for coders. But this mode requires the user to understand the software coding and deep learning. In addition, there is no latency guarantee for this mode, because the user may run the code on any hardware (CPU or GPU).

Figure 6:
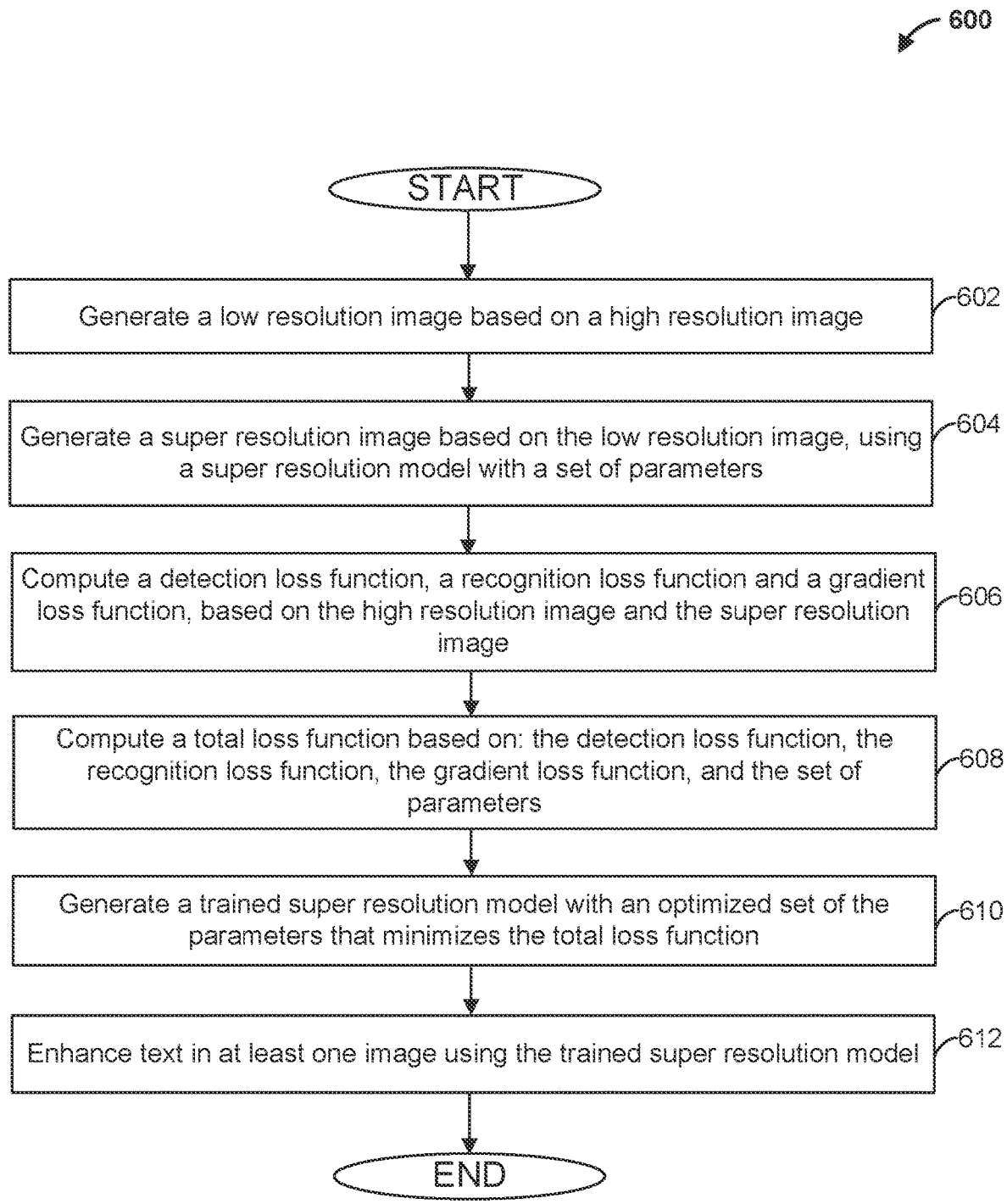
FIG. 6 is a flowchart illustrating an exemplary method for enhancing text in images based on super-resolution image generation, in accordance with some embodiments of the present teaching.

FIG. 6 is a flowchart illustrating an exemplary method 600 for enhancing text in images based on super-resolution image generation, in accordance with some embodiments of the present teaching. In some embodiments, the method 600 can be carried out by one or more computing devices, such as the super resolution image generation device 102 and/or the super resolution model training engine 121 of FIG. 1. Beginning at step 602, a low resolution image is generated based on a high resolution image. At step 604, a super resolution image is generated based on the low resolution image, using a super resolution model with a set of parameters.

At step 606, a detection loss function, a recognition loss function and a gradient loss function are computed based on the high resolution image and the super resolution image. At step 608, a total loss function is computed based on: the detection loss function, the recognition loss function, the gradient loss function, and the set of parameters.

A trained super resolution model is generated at step 610 with an optimized set of the parameters that minimizes the total loss function, e.g. after iterations of computing and minimizing the loss functions based on different high resolution images. At step 612, text in at least one image is enhanced using the trained super resolution model.

As discussed above, a super resolution model can be trained based on a deep learning using a neural network architecture. The efficacy of the neural networks to approximate any function depends heavily on the dataset used to train the model. Generating a paired LR-HR dataset by downsampling the HR images using interpolation methods such as linear, bicubic, and nearest-neighbour interpolation does not provide a good sample representative of the natural scene text datasets, by using a single down-sample formulation to generate all the LR images, and only learning the inverse of the downsampling function to generate the SR images. On the other hand, using images taken by a digital camera at different focal lengths to create a paired LR-HR dataset for image super-resolution is not a feasible approach to generate large-scale datasets required to train models.

In some embodiments, the disclosed system generates a suitable LR-HR pair for any large dataset to circumvent these challenges. The method used by the system involves a two-stage interpolation method to generate a synthetic dataset that can mimic the natural scene text datasets. In some examples, for a paired 2×LR-HR, the system first downsamples the original image to one-fourth of its original dimensions, followed by its upsampling to one-half of its original dimensions. Different interpolation techniques are randomly chosen for both downsampling and upsampling to introduce more randomness in the dataset, which makes the trained model more robust to any type of image degradations. The interpolation methods may include e.g. linear, bicubic, nearest, box, Hamming, and Lanczos, for both downsampling and upsampling of the images. In some embodiments, for training the super resolution model in batch mode, the system can create image patches of size 400 pixels×400 pixels of the HR image and 200 pixels×200 pixels for the LR image.

Despite high PSNR values, pixel value based loss functions like Mean Squared Error (MSE), Mean Absolute Error (MAE) fail to generate images with high-level attributes, such as, textures. Some perceptual loss function uses a pre-trained model to calculate the differences between the target and the output image in the feature space of the neural network, and generates high texture quality images, but fails to do justice with the reconstruction of the texts in the generated SR image.

In some embodiments, the system can add this new loss to the family of perceptual losses that focuses entirely on reconstructing high-quality texts with sharp boundaries and fine edges in the SR image. For example, the system can leverage the feature maps generated by a residual network block in a convolutional recurrent neural network of an encoder of a text recognition model. In some examples, a neural network model, e.g. ASTER (Attentional Scene TExt Recognizer), includes a pre-trained text recognition model including an encoder model and a decoder model. The encoder model includes multiple blocks (e.g. Blocks 0 to 5) of convolutional layers, where each block of convolutional layers outputs a feature map. In some examples, the system can generate feature maps from the fourth convolutional block of the pre-trained encoder of the text recognition ASTER model. In some embodiments, the system can compute Recognition Loss as the MSE between these feature maps of the generated SR image and the original HR image, as shown in Equation (1). Experiments have confirmed that the recognition loss adapts well with various text extraction use-cases, and the reconstructed text is of better quality than all other existing techniques.

$$L_{rec} = \|\Psi_n(I^{HR}) - \Psi_n(I^{SR})\|_2 \tag{1}$$

where $\Psi$ is the feature map obtained as an output of the n-th block of the ASTER's encoder model. In some embodiments, output of the fourth block works the best for text recognition related purposes.

In some embodiments, the system can also utilize Gradient Loss to ensure that the model can better detect edges and corners in the images. The gradient is calculated along each channel, followed by the mean across channels to negate abnormalities across different image channels. Finally, MAE may be used to calculate the gradient loss between the SR and the HR image pairs, as shown in Equation (2).

$$L_{grad} = \|\Delta I^{HR} - \Delta I^{SR}\|_1 \tag{2}$$

Here, $\Delta$ represents the cumulative gradient of the image and is calculated as shown below in Equation (3).

$$\Delta I = \frac{1}{2 \times channels} \sum_{channels} (\delta I_{width} + \delta I_{height}) \tag{3}$$

where, δ is the gradient of the image along its height/width, and is calculated as a difference beween the adjoining pixel values across each channel in the image. In some embodiments, δ has the same dimensions as the image on which it is calculated, i.e., same (width, height, channels), while Δ has the dimension of (width, height, 1).

In some embodiments, the system can compute a detection loss to ensure that the system can detect the precise locations of all the texts in an image with higher accuracy. A pre-trained model, e.g. a machine learning model pre-trained for text detection in images, may be used to generate the locations of the texts (e.g. detection boxes around the texts) in the SR image generated by the super resolution model and the original HR. The system can use the predicted coordinates of the SR and the HR images to create two mask images including detected regions being masked out using Equation (4) for each pixel. An MSE across the two masks is taken as the final detection loss value, as shown in Equation (5). Thus, the loss is a pixel-wise MSE, where each location represents if that pixel is part of text or not.

$$\text{img\_mask}(p) = \begin{cases} 1, & \text{if } p \text{ is in detected box} \\ 0, & \text{otherwise} \end{cases} \quad (4)$$

$$L_{det} = \frac{1}{P}\sum_p \|\text{HR\_mask}(p) - \text{SR\_mask}(p)\|^2 \quad (5)$$

where, P is the total number of pixels in the image, summation is taken over every individual pixel p, HR_mask is the detection mask created for the HR image and SR_mask is the detection mask created for the SR image.

In some embodiments, the system can compute an overall loss for the task as:

$$\text{TotalLoss} = \lambda_1 L_{rec} + \lambda_2 L_{det} + \lambda_3 L_{grad} + \lambda_4 L_{tv} + \lambda_5 L_{vgg} + \lambda_6 L_{mse} \quad (6)$$

where λ values may be [1e–2, 6e–5, 1e–4, 2e–4, 6e–3, 1e–0] in the same order as the loss functions in Equation (6). Except Total Variation (TV) Loss, which is measured only on the output SR image, every other loss function takes into account both the HR image and the SR image. $L_{vgg}$ is the perceptual loss calculated on a deep convolutional neural network, e.g. the visual geometry group network, with 19 layers, i.e. VGG-19.

In some embodiments, the total variatoin loss $L_{tv}$ is used to suppress the noise in the generated image. $L_{tv}$ can be used to measure the noise in the image by taking absolute difference between the neighbouring pixels. Unlike other loss functions, this loss $L_{tv}$ is only dependent on the SR image, as calculated by Equation (7).

$$L_{tv} = \frac{1}{HWC}\sum_{i,j,k}^{H,W,C} \sqrt{(SR_{i,j+1,k} - SR_{i,j,k})^2 + (SR_{i+1,j,k} - SR_{i,j,k})^2} \quad (7)$$

where H denotes the height of the image, W denotes the width of the image, and C denotes the number of channels in the image.

In some embodiments, the perceptual loss $L_{vgg}$ evaluates a loss based on the perceptual quality of the generated SR image as compared to the perceptual quality of the original HR image. It may be calculated using high-level features from a pre-trained image classification network. Instead of taking an MSE between the pixels of the image, the MSE is taken between the high-level features of the two images (SR image and HR image) to calculate the perceptual loss $L_{vgg}$, as in Equation (8).

$$L_{Percep} = \frac{1}{HWC}\sqrt{\sum_{i,j,k}^{H,W,C}(VGG_{i,j,k}(SR) - VGG_{i,j,k}(HR))^2} \quad (8)$$

where H denotes the height of the image, W denotes the width of the image, and C denotes the number of channels in the image.

In some embodiments, the MSR loss $L_{mse}$ mesures a difference between the pixel values of the HR and SR images, averaged over the number of pixels, as in Equation (9).

$$L_{mse} = \frac{1}{n}\sum_{i=1}^{n}\|HR_i - LR_i\|^2 \quad (9)$$

As shown in FIG. 4, based on an HR image from the dataset, the system can down-sample using some in-built methods in a library to obtain its corresponding LR image. This LR image is then fed into the super-resolution model to generate the SR image. The HR and the SR images are passed as inputs to the detection model followed by the recognition model. The system can collect the losses $L_{detection}$, $L_{recognition}$ and $L_{gradient}$, and compute their weighted sum termed as $L_{total}$ and use it to train the super-resolution model.

The disclosed super-resolution technique is generic, and can be used not just for OCR related use-cases, but also for non-OCR use-cases (e.g. barcode scanning) as it enhances the overall quality of the images.

There are two ways to gauge the performance of a model: visual perception and analytical scores. As the focus of the disclosed model is to improve the text in an image, experiments can be performed on datasets designed for the task of text extraction from images. These are open-source datasets such as datasets from International Conference on Data Analysis and Recognition, 2013 (ICDAR2013), International Conference on Data Analysis and Recognition, 2015 (ICDAR2015) and Street View Text (SVT). These three datasets provide word-level ground truth boxes of text in an image. One can use these ground truth boxes as the area of consideration for the disclosed super resolution model in terms of visual perception and the ground truth text for analytical scoring metrics. In some embodiments, the ground truth provided does not comprise all the words in the image but only the significant ones that are more clearly visible. The disclosed model is designed such that it improves not only these significant words but also the non-significant words (e.g. small/slightly blurred words). However, due to the lack of ground truth, the improvement for these non-significant words can only be seen through visual perception. The images can be down-sampled from the three datasets for creating an LR image dataset, where the original images act as the HR ground truth images. The disclosed super-resolution model can be compared against some state-of-the-art models such as DeNoising Convolutional Neural Network (DNCNN), lightweight image super-resolution with Information Multi-Distillation Network (IMDN) and Enhanced Super Resolution Generative Adversarial Networks (ESRGAN). While these competing techniques have focused on making the image sharper whereas, the disclosed method tries to make the text more legible in addition to improving quality of the image itself.

A super-resolution model is as good as the amount of finer details that it can improve. While there are existing approaches improving the quality of the overall image, the character boundaries get blurred after super-resolution generation in these models. Standard metrics used to verify the quality of super-resolution models can be the PSNR and the SSIM scores. However, these metrics do not reflect the quality of the characters in the image.

In some embodiments, the quality of the text drops even further while considering the words that are not significant. Based on some experiments, the disclosed model gives much better character boundaries than the existing models. Based on these experiments, it is visually clear that the disclosed model is performing significantly better. Since PSNR and SSIM scores are not effective measures, one can perform a more rigorous analysis to show that the disclosed model is significantly better in terms of text recognition.

To reduce the chance of misinterpretation, three annotators can be asked to independently check the images produced by the ESRGAN, IMDN, DNCNN and the disclosed model to identify the one from which understanding the text is the easiest. This is a blind process, where the annotators did not know which method produced which output. For this experiment, 20 images are chosen from each of the datasets: ICDAR2013, ICDAR2015 and SVT. In ~75% of the cases, the images produced by the disclosed method are declared the winner despite of having lower SSIM and PSNR scores.

From the SR images generated from different models, using the ground truth boxes provided in the dataset, the text areas are cropped and sent through a text recognition model. First, one can compare the accuracy—a direct match of ground truth word, and normalized edit distance—a character level comparison, of the backbone IMDN model against the model trained by the disclosed approach. For reference, these two models are both compared against the accuracy score on HR images. As a result, the model trained by the disclosed approach gets closer to the accuracy score for the HR images. Comparisons can also be performed between the disclosed model and other state-of-the-art models, on given datasets. As a result, on all the datasets, the disclosed model performs significantly better than other models in terms of text recognition.

In some embodiments, the disclosed super-resolution solution acts as a pre-processor for an AI service for Text Extraction from Images. The disclosed super-resolution solution can also be used for catalog enrichment and product matching. For example, by recognizing text from a super-resolution version of a product image, a catalog or category can be determined for the corresponding product even if the product description does not provide enough information.

In some embodiments, the technology described here is generic enough to be applied to various other application areas beyond product images, maybe with some domain-specific finetuning.

In some examples, Walmart can serve its customers by delivering goods and merchandise at affordable prices and by facilitating healthier lifestyles. In addition to selling medicines at Walmart stores, Walmart Health now provides primary, urgent and preventive healthcare services in some of Walmart supercenters. While selling or administering medicine, one must be very careful about its expiry date to prevent harmful effects. Moreover, getting the ingredients wrong for a medicine may also endanger human lives. Therefore, unlike standard product images, the tolerance level of making a false prediction is close to zero in healthcare. Extracting the dates, especially, can be much more challenging, because these are added to the labels at a later stage and are often more obscure than the rest of the text. The disclosed super resolution solution can be helpful in this domain with some small improvements, such as, adding the names of the drugs and their constituents into the dictionary, because these names do not appear in regular text.

In other examples, Walmart has given away smartphones with built-in apps to associates to help them in their day to day activities in various ways. These devices can be used for inventory management and quality checks. For example, an associate may take a picture and notify the warehouse administration upon detecting a damaged product. However, the cameras mounted on the smartphones may not be of high definition, or the pictures may be taken from a distance, or there can be jerky hand movements—all of which may lead to low quality, tiny or blurry images. Similarly, the surveillance cameras placed on top of the aisles in Walmart stores and clubs may also be re-purposed to additionally gather information on products that are low or out-of-stock and identify damaged goods. But these images may again be of low quality. The disclosed super resolution based solution may also contribute to such cases. Another potential use case can be reading road signs for autonomous cars, e.g. for supply chain management, especially for the last mile delivery.

Because of the importance of the scene text image super-resolution for text detection and recognition, various embodiments of the present teaching disclosed an alternative way to generate the synthetic paired LR-HR dataset that mimics the actual data compared to the simple bicubic downsampling of the HR images. The super-resolution model trained with the disclosed method on some public dataset specializes in making the text more legible while enhancing quality of low-resolution images, and performs superior to the models trained on images generated by bicubic downsampling to handle scene text images in the wild through a series of experiments. To handle scene text image super-resolution, the system can utilize recognition loss and an improvised architecture that enables the super resolution model to reconstruct the texts with clear boundaries and sharp edges in real-time. The disclosed method outperforms multiple other methods by a significant margin. In some embodiments, one can include more diverse scene text image datasets across multiple languages and with different alignments to train the model. In some embodiments, vision transformers can be added into the scene text super-resolution domain to further improve performance.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of exemplary embodiments, it is not limited thereto. Rather, the appended claims should be construed broadly, to include other variants and embodiments, which can be made by those skilled in the art.

What is claimed is:

1. A system for enhancing text in images, comprising:
a non-transitory memory having instructions stored thereon; and
at least one processor operatively coupled to the non-transitory memory, and configured to read the instructions to:
obtain a high resolution image;
generate a low resolution image based on the high resolution image, wherein the low resolution image is generated by:
down-sampling, based on a first interpolation method, the high resolution image to one-fourth of a dimension of the high resolution image to generate an intermediate image, and
up-sampling, based on a second interpolation method, the intermediate image to one-half of the dimension of the high resolution image to generate the low resolution image;
generate a super resolution image based on the low resolution image, using a super resolution model with a set of parameters;
based on the high resolution image and the super resolution image, compute a total loss function based on the set of parameters and at least one of: a detection loss function, a recognition loss function, and a gradient loss function;
generate a trained super resolution model with an optimized set of the parameters that minimizes the total loss function; and
enhance text in at least one image using the trained super resolution model.

2. The system of claim 1, wherein the total loss function is computed based on:
computing the detection loss function representing a difference between text locations detected in the high resolution image and the super resolution image;
computing the recognition loss function representing a difference between texts recognized from the high resolution image and the super resolution image; and
computing the gradient loss function representing a difference between image gradients in the high resolution image and the super resolution image.

3. The system of claim 2, wherein the trained super resolution model is generated based on:
generating an updated super resolution model with an updated set of the parameters based on a minimization of the total loss function;
obtaining a plurality of additional high resolution images, wherein the high resolution image and the additional high resolution images form a series of images, with the high resolution image being the first image in the series; and
for each additional high resolution image in the series:
generating an additional low resolution image based on the additional high resolution image;
generating an additional super resolution image based on the additional low resolution image, using the updated super resolution model with the updated set of the parameters from preceding image in the series;
computing an additional detection loss function, an additional recognition loss function, an additional gradient loss function, and an additional total loss function, based on the additional high resolution image and the additional super resolution image; and
based on a minimization of the additional total loss function, generating an updated super resolution model with an updated set of the parameters to be used for next image in the series.

4. The system of claim 3, wherein generating the additional low resolution image for each additional high resolution image in the series comprises:
down-sampling, based on a third interpolation method, the additional high resolution image to one-fourth of a dimension of the additional high resolution image to generate an intermediate image; and
up-sampling, based on a fourth interpolation method, the intermediate image to one-half of the dimension of the additional high resolution image to generate the additional low resolution image,
wherein each of the third interpolation method and the fourth interpolation method is based on an interpolation randomly selected from the group consisting of: linear interpolation, bicubic interpolation, nearest interpolation, box interpolation, Hamming interpolation, and Lanczos interpolation.

5. The system of claim 2, wherein:
the set of parameters comprises: a first weight associated with the detection loss function, a second weight associated with the recognition loss function, and a third weight associated with the gradient loss function; and
the total loss function is computed based on a weight sum of the detection loss function, the recognition loss function, and the gradient loss function, with their respective associated weights.

6. The system of claim 5, wherein:
the set of parameters further comprises: a fourth weight associated with a total variation loss function computed based merely on the super resolution image, a fifth weight associated with a perceptual loss function computed based on the high resolution image and the super resolution image, and a sixth weight associated with a mean square error loss function computed based on the high resolution image and the super resolution image; and the total loss function is computed based on a weight sum of the detection loss function, the recognition loss function, the gradient loss function, the total variation loss function, the perceptual loss function, and the mean square error loss function, with their respective associated weights.

7. The system of claim 2, wherein the detection loss function is computed based on:
   generating coordinates of the high resolution image to create a first image mask, which includes detected text regions being masked out for each pixel of the high resolution image;
   generating coordinates of the super resolution image to create a second image mask, which includes detected text regions being masked out for each pixel of the super resolution image; and
   computing the detection loss function based on a pixel-wise mean square error between the first image mask and the second image mask.

8. The system of claim 2, wherein the recognition loss function is computed based on:
   generating a first feature map from the high resolution image based on a convolutional function;
   generating a second feature map from the super resolution image based on the convolutional function; and
   computing the recognition loss function based on a mean square error between the first feature map and the second feature map.

9. The system of claim 2, wherein the gradient loss function is computed based on:
   generating a first cumulative gradient averaged across all channels in the high resolution image;
   generating a second cumulative gradient averaged across all channels in the super resolution image; and
   computing the gradient loss function based on a mean absolute error between the first cumulative gradient and the second cumulative gradient.

10. The system of claim 1, wherein the text in the at least one image is enhanced based on:
    generating a super resolution version of the at least one image using the trained super resolution model via at least one of: an application programming interface, a workflow application, or a software library; and
    extracting text from the super resolution version of the at least one image.

11. A computer-implemented method, comprising:
    obtaining a high resolution image;
    generating a low resolution image based on the high resolution image, wherein the low resolution image is generated by:
      down-sampling, based on a first interpolation method, the high resolution image to one-fourth of a dimension of the high resolution image to generate an intermediate image, and
      up-sampling, based on a second interpolation method, the intermediate image to one-half of the dimension of the high resolution image to generate the low resolution image;
    generating a super resolution image based on the low resolution image, using a super resolution model with a set of parameters;
    based on the high resolution image and the super resolution image, computing a total loss function based on the set of parameters and at least one of: a detection loss function, a recognition loss function, and a gradient loss function;
    generating a trained super resolution model with an optimized set of the parameters that minimizes the total loss function; and
    enhancing text in at least one image using the trained super resolution model.

12. The computer-implemented method of claim 11, wherein computing the total loss function comprises:
    computing the detection loss function representing a difference between text locations detected in the high resolution image and the super resolution image;
    computing the recognition loss function representing a difference between texts recognized from the high resolution image and the super resolution image; and
    computing the gradient loss function representing a difference between image gradients in the high resolution image and the super resolution image.

13. The computer-implemented method of claim 12, wherein generating the trained super resolution model comprises:
    generating an updated super resolution model with an updated set of the parameters based on a minimization of the total loss function;
    obtaining a plurality of additional high resolution images, wherein the high resolution image and the additional high resolution images form a series of images, with the high resolution image being the first image in the series; and
    for each additional high resolution image in the series:
      generating an additional low resolution image based on the additional high resolution image;
      generating an additional super resolution image based on the additional low resolution image, using the updated super resolution model with the updated set of the parameters from preceding image in the series;
      computing an additional detection loss function, an additional recognition loss function, an additional gradient loss function, and an additional total loss function, based on the additional high resolution image and the additional super resolution image; and
      based on a minimization of the additional total loss function, generating an updated super resolution model with an updated set of the parameters to be used for next image in the series.

14. The computer-implemented method of claim 13, wherein generating the additional low resolution image for each additional high resolution image in the series comprises:
    down-sampling, based on a third interpolation method, the additional high resolution image to one-fourth of a dimension of the additional high resolution image to generate an intermediate image; and
    up-sampling, based on a fourth interpolation method, the intermediate image to one-half of the dimension of the additional high resolution image to generate the additional low resolution image,
    wherein each of the third interpolation method and the fourth interpolation method is based on an interpolation randomly selected from the group consisting of: linear interpolation, bicubic interpolation, nearest interpolation, box interpolation, Hamming interpolation, and Lanczos interpolation.

15. The computer-implemented method of claim 12, wherein:

the set of parameters comprises: a first weight associated with the detection loss function, a second weight associated with the recognition loss function, and a third weight associated with the gradient loss function; and the total loss function is computed based on a weight sum of the detection loss function, the recognition loss function, and the gradient loss function, with their respective associated weights.

16. The computer-implemented method of claim 12, wherein computing the detection loss function comprises:
generating coordinates of the high resolution image to create a first image mask, which includes detected text regions being masked out for each pixel of the high resolution image;
generating coordinates of the super resolution image to create a second image mask, which includes detected text regions being masked out for each pixel of the super resolution image; and
computing the detection loss function based on a pixel-wise mean square error between the first image mask and the second image mask.

17. The computer-implemented method of claim 12, wherein computing the recognition loss function comprises:
generating a first feature map from the high resolution image based on a convolutional function;
generating a second feature map from the super resolution image based on the convolutional function; and
computing the recognition loss function based on a mean square error between the first feature map and the second feature map.

18. A non-transitory computer readable medium having instructions stored thereon, wherein the instructions, when executed by at least one processor, cause a device to perform operations comprising:
obtaining a high resolution image;
generating a low resolution image based on the high resolution image, wherein the low resolution image is generated by:
down-sampling, based on a first interpolation method, the high resolution image to one-fourth of a dimension of the high resolution image to generate an intermediate image, and
up-sampling, based on a second interpolation method, the intermediate image to one-half of the dimension of the high resolution image to generate the low resolution image;
generating a super resolution image based on the low resolution image, using a super resolution model with a set of parameters;
based on the high resolution image and the super resolution image, computing a total loss function based on the set of parameters and at least one of: a detection loss function, a recognition loss function, and a gradient loss function;
generating a trained super resolution model with an optimized set of the parameters that minimizes the total loss function; and
enhancing text in at least one image using the trained super resolution model.

19. The non-transitory computer readable medium of claim 18, wherein:
the set of parameters comprises: a first weight associated with the detection loss function, a second weight associated with the recognition loss function, a third weight associated with the gradient loss function, a fourth weight associated with a total variation loss function computed based merely on the super resolution image, a fifth weight associated with a perceptual loss function computed based on the high resolution image and the super resolution image, and a sixth weight associated with a mean square error loss function computed based on the high resolution image and the super resolution image; and
the total loss function is computed based on a weight sum of: the detection loss function, the recognition loss function, the gradient loss function, the total variation loss function, the perceptual loss function, and the mean square error loss function, with their respective associated weights.

* * * * *